United States Patent Office 2,969,750
Patented Jan. 31, 1961

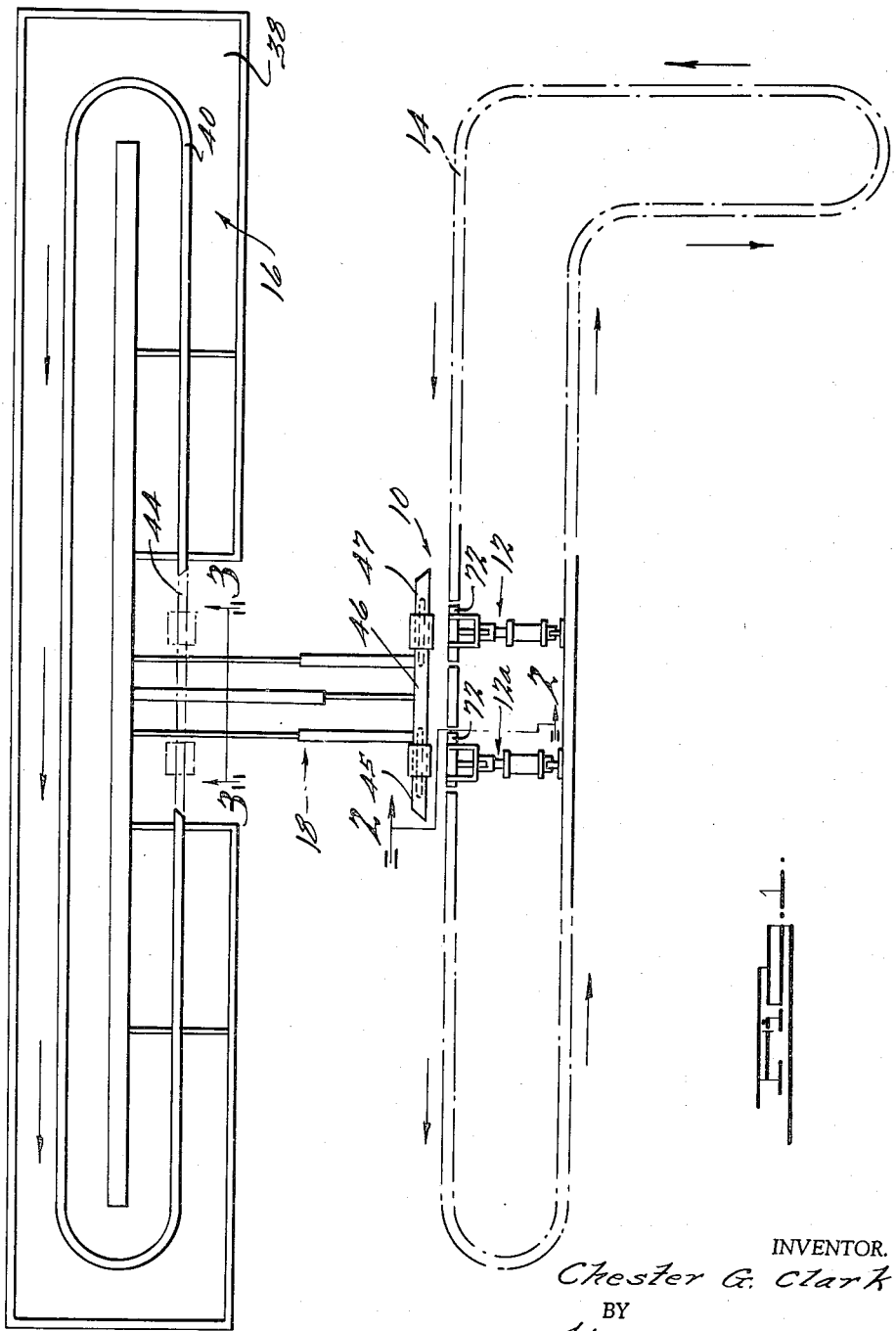

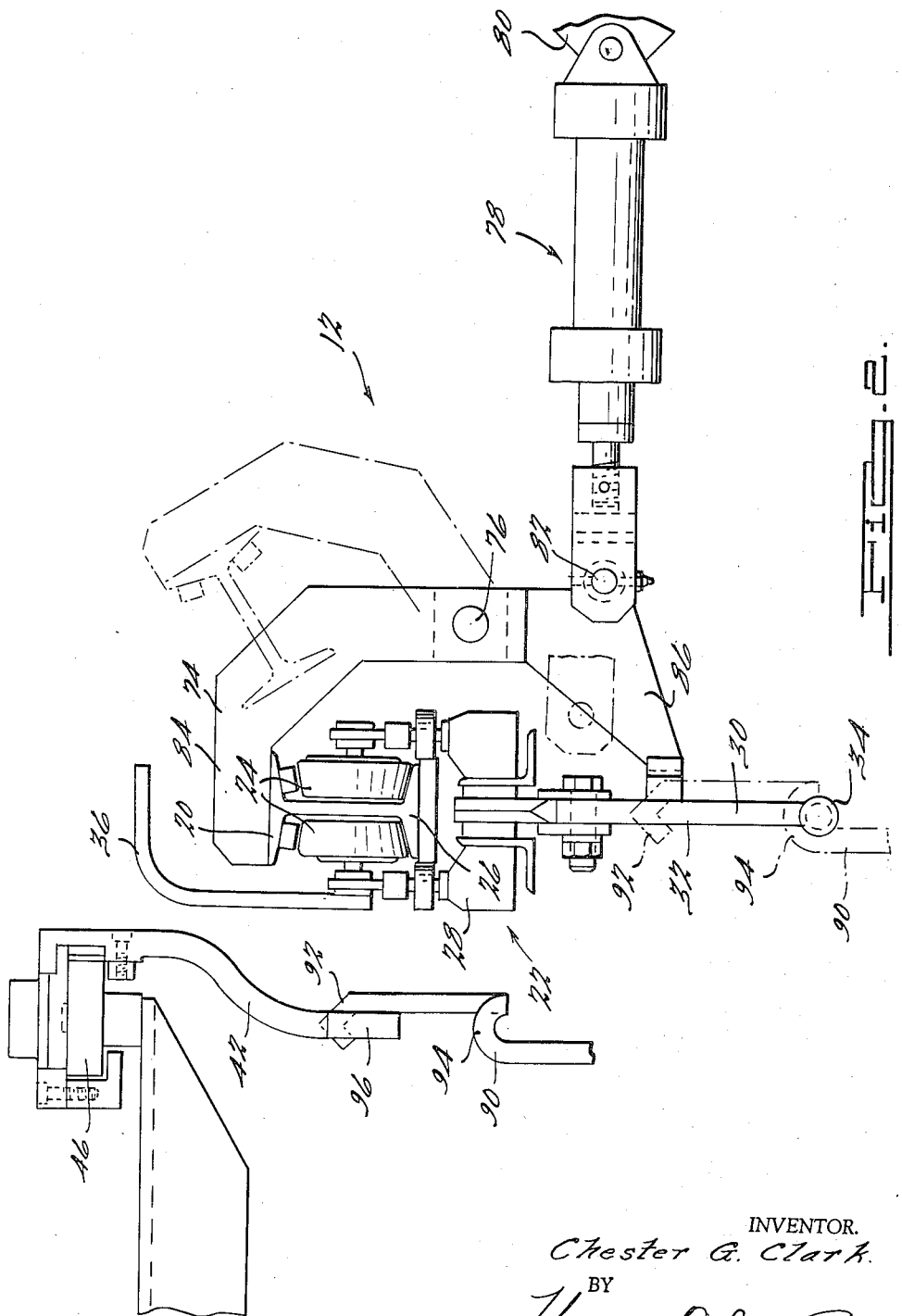

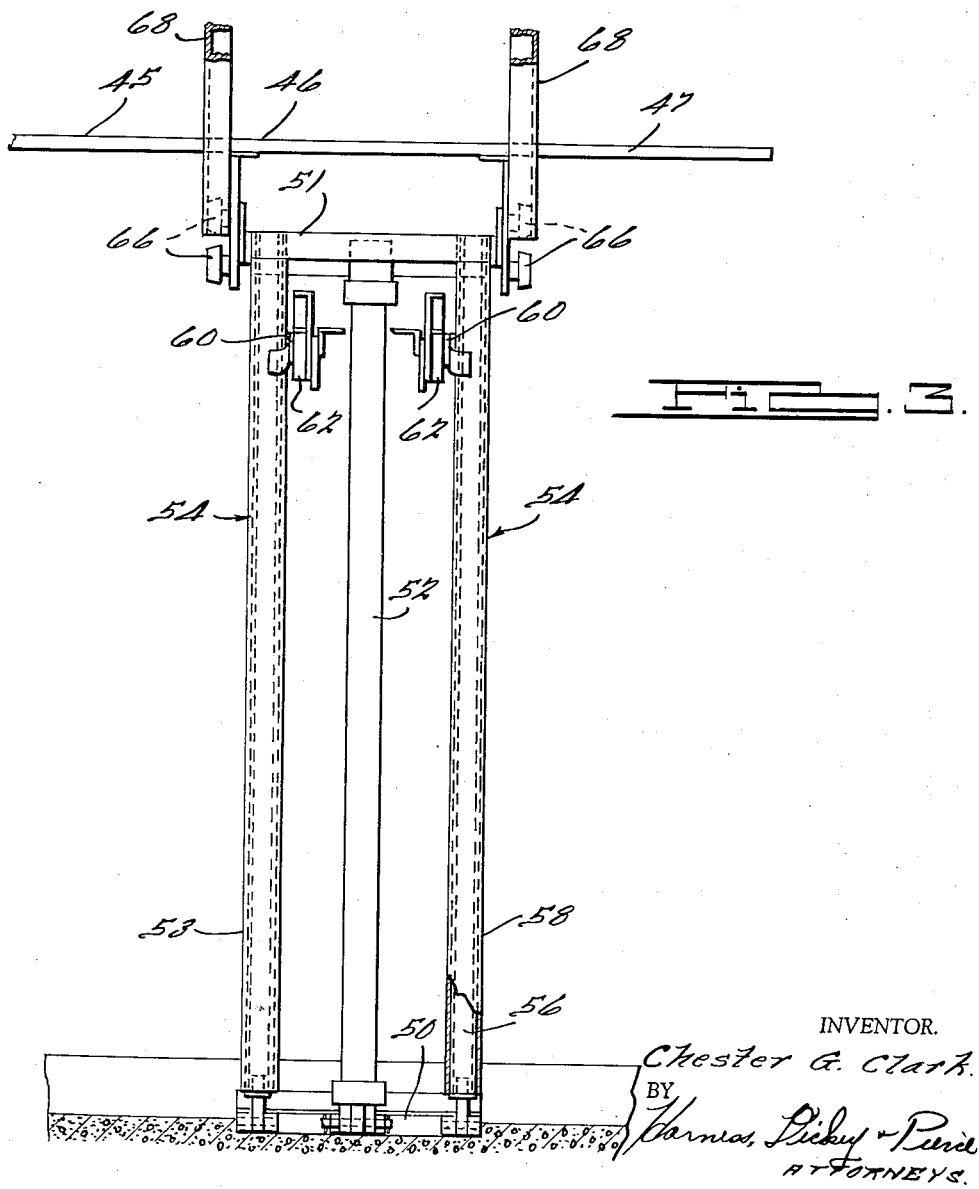

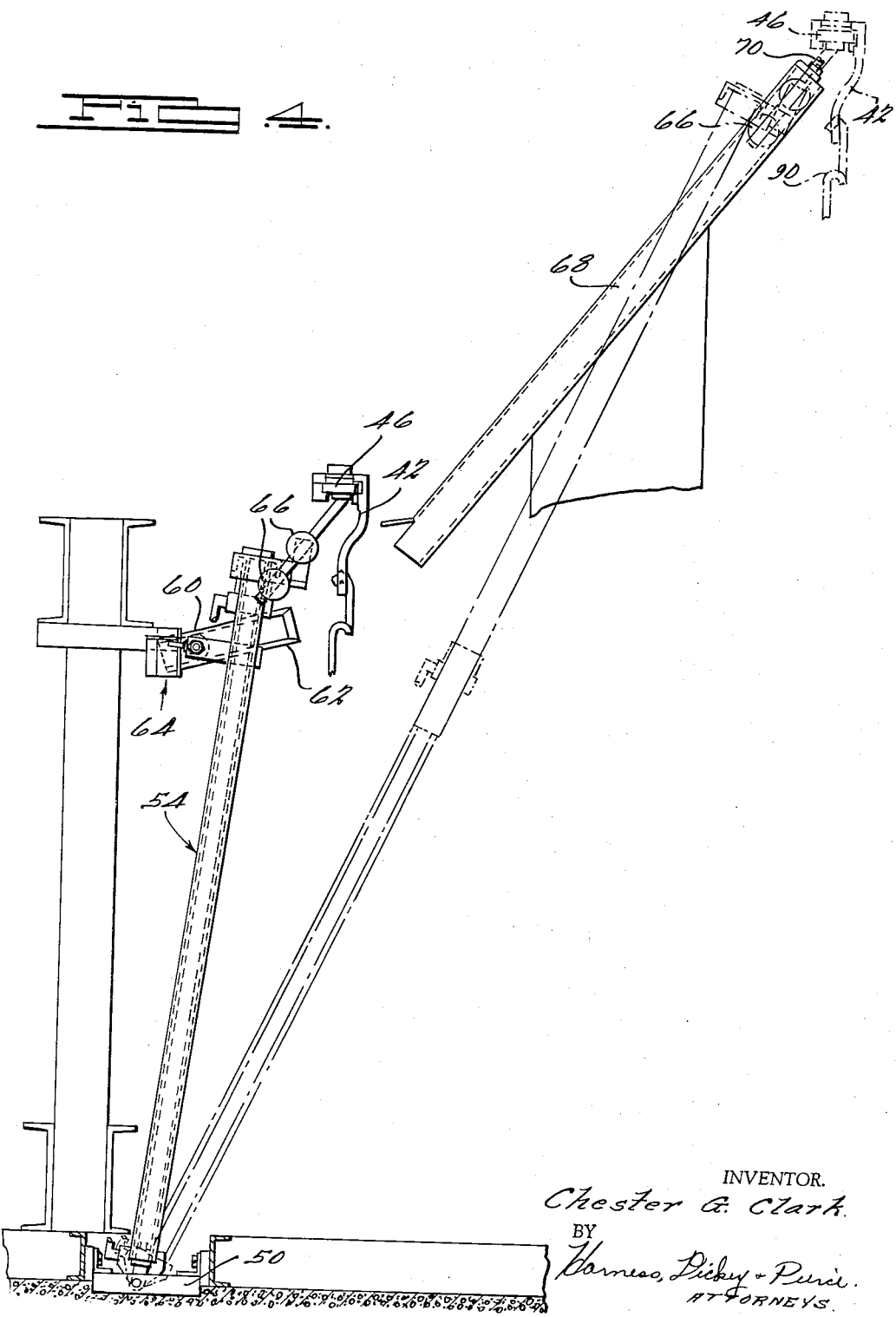

2,969,750

RACK LOADING AND UNLOADING MECHANISM

Chester G. Clark, Detroit, Mich., assignor to The Udylite Corporation, Detroit, Mich., a corporation of Delaware Filed Dec. 6, 1957, Ser. No. 701,037

9 Claims. (Cl. 104—96)

This invention relates generally to work handling apparatus for use in conjunction with plating machines and more particularly to apparatus for transferring work back and forth between a shop conveyor of the type having work carrying trolleys mounted on a track and the plating machine.

In the use of a plating machine in a shop having a conveyor of the above type, transfer of pieces to be plated to the plating machine and removal of plated pieces from the machine must be accomplished without removing the trolleys or the like from the shop conveyor. This cannot be accomplished by using only a loader of the type disclosed in Davis Patent 2,645,186. Accordingly, this invention provides transfer apparatus for transferring only work supporting racks back and forth between the shop conveyor and a loader for the machine.

An object of this invention is to provide an improved work handling apparatus for moving work back and forth between a plating machine and a shop conveyor.

A further object of this invention is to provide transfer apparatus of the above type which is positive in operation in transferring the workpieces to and from trolleys which are in exact predetermined positions on the shop conveyor.

Still a further object of this invention is to provide transfer apparatus of the above described type which is simple in construction, economical to manufacture, and efficient in operation in transferring workpieces back and forth between a plating machine and a shop conveyor.

Further objects, features, and advantages of this invention will become apparent from a consideration of the following description, the appended claims and the accompanying drawing in which:

Fig. 1 is a diagrammatic top plan view of a plating machine and a shop conveyor showing the transfer apparatus of this invention in assembly relation therewith;

Fig. 2 is an enlarged sectional view looking substantially along the line 2—2 in Fig. 1;

Fig. 3 is an enlarged fragmentary sectional view looking substantially along the line 3—3 in Fig. 1; and Fig. 4 is an elevational view of the loader shown in Figs. 1 and 3 and showing a retracted position of the loader in solid lines and an extended elevated position of the loader in broken lines.

With reference to the drawing, the transfer apparatus of this invention, indicated generally at 10, is illustrated in Fig. 1 as consisting of a pair of transfer devices 12 and 12a associated with a shop conveyor 14 and a plating machine 16 having a hydraulic loader 18. The conveyor 14 is illustrated as being of endless type traveling in the direction of the arrows shown but it is to be understood that it may be of straight line type, depending entirely on the particular requirements for handling and treating work on the conveyor 14.

The conveyor 14 includes a track member 20, illustrated as an I-beam, and a plurality of trolleys or rack holder, one of which is indicated generally at 22 in Fig. 2. Each trolley 22 includes two sets of inwardly facing wheels or rollers 24 supported on the lower flange 26 for the I-beam 20 and a carriage 28 having a depending loop 30 which includes upright legs 32 and a horizontal bottom portion 34.

An upwardly extending pusher arm 36 on the carriage 28 adapts the trolley 22 for driving and indexing with any suitable mechanism, such as another conveyor apparatus.

The plating machine 16 is of the type shown in Patent 2,479,322 and includes a tank structure 38 divided into compartments for containing various solutions or baths in which the work is successively treated. A rail 40 follows and overlies the compartments in the tank structure 38 and carries a number of slidably mounted work carriers or hooks of the general shape indicated at 42 in Fig. 2, which are moved intermittently along the rail 40 by any suitable means. A gap 44 in the rail 40 is of a size to be filled with a rail segment 46 that forms a part of the loader 18 which moves between the solid and broken line positions illustrated in Figs. 1 and 4.

The loader 18 is of well known construction, including a base 50 mounted adjacent the machine 16 and a hydraulic piston and cylinder assembly 52 pivotally secured at its lower end to the base 50 and attached at its upper end to a central portion of a frame 51 which carries the rail segment 46. A pair of telescoping arm assemblies 54 arranged on opposite sides of the cylinder assembly 52 are similarly secured at their upper ends to the frame 51 and pivotally connected at their lower ends to the base 50.

Each of the telescoping arm assemblies 54 includes an inner or lower tube 56 which is pivotally secured to the base 50 and which slides within an outer tube 58 secured at its upper end to the frame 51. Intermediate its ends, each outer tube 58 carries a roller 60 adapted to travel along an upwardly inclined track 62 supported on an upright frame structure 64. In the lower or retracted position of the cylinder assembly 52 the rollers 60 are at the lower ends of the tracks 62. On extension of the cylinder assembly 52, the rollers 60 travel upwardly on the tracks 62 so as to swing both the cylinder assembly 52 and the telescoping arm assemblies 54 in a clockwise direction about the lower ends thereof as viewed in Fig. 4. Such movement of the loader 18 moves the upper end thereof to a position in which pairs of rollers 66 carried thereby travel upwardly along a corresponding pair of track structures 68. When the cylinder assembly has been extended sufficiently to move the rollers 66 into engagement with stops 70 at the upper ends of the track structures 68 the rail segment 46 is located in the position shown in Figs. 1 and 2 adjacent the shop conveyor 14.

It is seen, therefore, that the loader 18 acts to move a work carrier 42 on one end portion 45 of the rail segment 46 along an upwardly inclined path to one side of the machine 16 to locate the work carrier 42 in the final position illustrated in Figs. 1 and 2 in which a work rack provided with a plated workpiece is movable by the transfer apparatus 10 to the shop conveyor 14. An empty work carrier 42 on the opposite end portion 47 of the rail segment 46 receives a work rack provided with a workpiece to be plated from the transfer apparatus 10 in a manner to be hereinafter described.

Each of the transfer devices 12 and 12a includes a segment 72 of the conveyor track 20, and a frame member 74 supported on a horizontal pivot member 76 which is substantially parallel to the corresponding track segment 72. A hydraulic cylinder assembly 78 forms a part of each transfer device and is pivotally connected at one end to a fixed support 80 and at the other end is connected by a pivot 82 to the frame member 74 at a position below the pivot member 76.

Each frame member 74 is of an irregular shape having a transversely extending upper portion 84 which is secured to the top side of the corresponding track segment 72 and a transversely extending lower portion 86 movable into engagement with a trolley loop 30 to support the loop during tilting thereof in response to extension of the cylinder assembly 78. As shown in Fig. 2, a transfer device is swingable about the pivot 76 therefor to a position shown in broken lines, which is of course adjustable within reasonable limits determined by the extent to which the piston rod for the cylinder assembly is extended.

In the operation of the machine 16 with the transfer apparatus 10, a suitable indexing and stop mechanism (not shown) is employed for moving an empty trolley 22, namely, one without a work supporting rack on the loop 30 therefor, to a supported position on the track segment 72 for the device 12a. Any suitable stop, such as a retractable leg or the like (not shown) engageable with the pusher arm 36, is operable to provide for stopping of the trolley 22 on the track section 72 at the desired position in which the lower portion 86 of the frame 74 for the transfer device 12a is engageable with the loop 30 on extension of the hydraulic cylinder assembly 78. A trolley with a rack having a workpiece to be plated is similarly moved onto the track segment 72 for the transfer device 12.

A control mechanism (not shown) then provides for operation of the transfer devices 12 and 12a and the loader 18 in the following sequence. The transfer device 12 operates to swing the rack, indicated in broken lines at 90 in Fig. 2, on the trolley 22 positioned on the device 12 to a position to one side of the conveyor 14, with the weight of the rack 90, and the work thereon, providing for a swinging of the rack 90 on the supporting portion 34 of the loop 30 so that the upper hooked end 92 of the rack 90 extends upwardly from the loop 30. As best appears in Fig. 2, the intermediate portion 94 of the rack 90 which is supported on the loop portion 34 is of a curved construction to function as a bearing portion to facilitate this swinging movement.

Immediately after the transfer device 12 has moved the rack 90 thereon to approximately the solid line position of the rack 90 illustrated in Fig. 2, the loader 18 completes its inclined upward movement so that a lower end portion 96 of a work carrier 42 thereon is positioned under the hooked upper end 92 of the rack 90.

As illustrated in Fig. 1, the loader 18 is of double station type so that the work rail segment 46 is of a length to provide for the support of a pair of work carriers 42 thereon. As a result, a work carrier 42 having a rack 90 provided with a plated workpiece thereon is moved on the end portion 45 of the rail segment 46 to a position opposite the transfer device 12a. Consequently, when the device 12a is now operated to move the loop 30 for the empty trolley 22 thereon to the tipped position illustrated in dotted lines in Fig. 2, the portion 34 of the loop 30 is engageable with the intermediate portion 94 of the rack 90 which is provided with the plated workpiece, so as to lift that rack 90 off the carrier 42 therefor.

The device 12 is then retracted to return the empty trolley thereon to a position in which it is movable onto the adjacent fixed portion of the conveyor track 14. The loader 18 is then retracted, leaving a rack 90 with a plated workpiece on the transfer device 12a, to move the rail segment 46 into the gap 44 in the plating machine work rail 40, following which the transfer device 12a is retracted so that the trolley with the work rack 90 having the plated workpiece thereon is movable onto the conveyor track 14 for subsequent travel to an unloading point thereon.

The shop conveyor 14 and the machine 16 are then indexed in the usual manner to provide for an intermittent movement of the work carriers thereon through the desired cycle.

Although the invention has been described with respect to the preferred embodiment thereof, it is to be understood that it is not to be so limited, since changes can be made therein which are in the scope of the appended claims.

What is claimed is:

1. Apparatus for transferring racks for supporting workpieces in a plating machine back and forth between a loader for the machine and a shop conveyor of the type which includes a substantially horizontally extending track and a plurality of trolleys mounted on the track, and wherein said track has a pair of movable sections each of which is mounted for swinging movement about a substantially horizontal axis parallel thereto between a first position aligned with adjacent track sections and a second pivoted position to one side of said first position; said apparatus comprising power means associated with each of said sections and operable to swing said section between said first and second positions so that a rack having an unplated workpiece thereon is moved from a trolley on one section to the loader and a trolley on the other section receives a rack having a plated workpiece thereon from said loader.

2. For use with a plating machine having a movable loader and a shop conveyor of the type which includes a substantially horizontally extending track and a plurality of trolleys mounted on the track for controlled movement therealong, a feeding mechanism for transferring racks for workpieces back and forth between said loader and said shop conveyor, said feeding mechanism including a pair of sections of said track which are separate from other sections thereof, a supporting frame for each of said sections pivotally supported for swinging movement about a substantially horizontal axis parallel to said section, power means connected to each of said frames, each power means being operable to swing the corresponding frame from said loader to said track and vice versa.

3. For use with a plating machine having a loader and a shop conveyor of the type which includes a substantially horizontally extending track and a plurality of trolleys mounted on the track for controlled movement therealong, and wherein the loader moves along an upwardly inclined path in moving from a position adjacent the machine to a position adjacent the conveyor, a feeding mechanism for transferring racks for workpieces back and forth between said loader and said shop conveyor, said feeding mechanism including a pair of movable track sections which are aligned with and separate from other sections of said track, a supporting frame for each of said pair of sections pivotally supported for swinging movement about a substantially horizontal axis parallel to said section, power means corresponding to and connected to said frames, each power means being operable to swing the corresponding frame in a direction such that a portion of a trolley thereon is swung upwardly for either receiving a rack from said loader or transferring a rack to the loader.

4. For use with a plating machine having a loader and a shop conveyor of the type which includes a substantially horizontally extending track and a plurality of trolleys mounted on the track for controlled movement therealong, apparatus for transferring racks for workpieces back and forth between said loader and said shop conveyor, each of said racks having a bearing portion intermediate the ends thereof and a hook-shaped upper end, said transfer apparatus including a pair of movable track sections aligned with and separate from other sections of the track, a supporting frame for each of said pair of sections pivotally supported for swinging movement about a substantially horizontal axis parallel to said section, power means corresponding to and connected to said frames, each power means being operable to swing the corresponding frame for transferring a rack between a trolley on said frame and said loader, a depending loop member carried by each trolley for supporting a rack in a position in which the bearing portion thereof rests on said loop member, one of said frames being movable so that a rack thereon is in a position in which the hook-shape upper end thereof is picked up by said loader, and the other one of said frames being movable so that the loop on a trolley thereon is movable into a supporting relation with the bearing portion of a rack having the hook-shape upper end thereof carried on said loader.

5. Apparatus for transferring racks for supporting workpieces in a plating machine back and forth between a loader for the machine and a shop conveyor of the type which includes a substantially horizontally extending track and a plurality of trolleys mounted on the track, each of said racks having a bearing portion intermediate the ends thereof and a hook-shape upper end, each of said trolleys including a depending loop frame, and wherein said track has a pair of movable sections each of which is mounted for swinging movement about a substantially horizontal axis parallel thereto between a first position aligned with adjacent track sections and a second pivoted position to one side of said first position; said apparatus comprising power means associated with each of said sections and operable to swing said section between said first and second positions so that one section moves a rack having the bearing portion thereof resting on the loop frame of said trolley on said section to a position to have the upper end thereof picked up by the loader and the loop frame on the trolley on the other section is moved upwardly into a supporting relation with the bearing portion of a rack having a plated workpiece thereon and having the upper end thereof suspended from said loader.

6. Apparatus for transferring racks for workpieces between a first conveyor of the type having a track with at least one gap therein and a second conveyor of the type movable from a position substantially parallel to and adjacent to said track to a position away from said track comprising at least one track section mounted for movement between a first position filling said gap and a second position in which a rack supported thereon is in substantial alignment with said second conveyor when said second conveyor is adjacent to said track and said gap, and means attached to said track section for effecting said movement.

7. Apparatus for transferring racks for workpieces between a first conveyor of the type having a track with at least one gap therein and a second conveyor of the type movable from a position substantially parallel to and adjacent to said track to a position away from said track comprising at least one track section mounted for pivotal movement about an axis parallel thereto between a first position filling said gap and a second position in which a rack supported thereon is in substantial alignment with said second conveyor when said second conveyor is adjacent to said track and said gap, and means attached to said track section for effecting said movement.

8. Apparatus for transferring racks for workpieces to a loader from a shop conveyor and vice versa which comprises a shop conveyor track having a pair of spaced gaps therein and a loader having a support member movable between a position slightly spaced from and substantially parallel to said track and having sufficient length to span said gaps and the track therebetween, which comprises a pair of track sections adapted to fill said gaps, means attached to said track sections for moving said track sections between a first position in alignment with said track and a second position in which a rack supported on each of said sections is in substantial alignment with said support member when said support member is slightly spaced from said track.

9. Apparatus for transferring racks for workpieces between a first conveyor of the type having a track with at least one gap therein and a second conveyor of the type movable from a position substantially parallel to and adjacent to said track to a position away from said track comprising at least one track section, trolley means on said track section, said track section mounted for pivotal movement about an axis parallel thereto between a first position in alignment with said track and a second position in which a rack supported on said trolley is in substantial alignment with said second conveyor when said second conveyor is adjacent to said track and said gap, power means attached to said track section for pivoting said section between said positions and means on said power means contacting and supporting said trolley during the pivoting thereof to said second position.

References Cited in the file of this patent

UNITED STATES PATENTS

| | | |
|---|---|---|
| 2,525,327 | Weber | Oct. 10, 1950 |
| 2,645,186 | Davis | July 14, 1953 |
| 2,681,015 | Davis | June 15, 1954 |